March 21, 1961

A. P. HENRY 2,975,766

HYDRAULIC ROTARY ACTUATOR WITH UNRESTRAINED
VANE AND SEAL MEMBERS
Filed April 28, 1958

INVENTOR.
AUGUSTUS P. HENRY

BY
Beehler & Shanahan
ATTORNEYS.

United States Patent Office 2,975,766
Patented Mar. 21, 1961

2,975,766

HYDRAULIC ROTARY ACTUATOR WITH UNRESTRAINED VANE AND SEAL MEMBERS

Augustus P. Henry, Los Angeles, Calif., assignor to Kelsey-Hayes Company, Los Angeles, Calif., a corporation of Delaware Filed Apr. 28, 1958, Ser. No. 731,250

12 Claims. (Cl. 121—99)

This invention relates generally to hydraulic rotary actuators, and more particularly to such an actuator in which fluid pressure is applied to approximately 180° of the surface of unrestrained cylindrical vanes received in vane slots in the surfaces of an associated rotor and stator, and sealing is achieved by means of a seal strip of small diameter in a seal slot at the bottom of each of said vane slots.

The hydraulic actuator is the classic choice of engineers for applications in which great force must be exerted over a short distance within the confines of a small space. When such actuators are used in machine tools or motor vehicles, a relatively heavy device operating at several hundred pounds per square inch is usually employed. However, rotary hydraulic actuators for airplanes are required to supply great power in both a small space and in a light weight device. The design parameter associated with such requirements is higher and higher pressure for increasing power requirements without increasing size and weight. At the present time pressure in aircraft actuators is usually 3,000 pounds per square inch, and there is some indication that even higher pressures may be employed in the future.

Designs for rotary hydraulic actuators suitable for non-aircraft applications and operating at a few hundred pounds per square inch have generally proven unsatisfactory and usually inoperable at the typical aircraft hydraulic pressure of 3,000 pounds per square inch. For example, designs which have sliding friction characteristics which are not a problem at pressures of less than 1,000 pounds per square inch may operate at high pressures with a jerky movement of sudden starts and stops, or may chatter or jam to an immovable stop. Sometimes it is necessary to reverse a rotary hydraulic actuator, momentarily, before further progress can be made in a given direction. At the high pressures of several thousand pounds per square inch, the effects of the hydraulic fluid on the design become more significant than the effects of the load.

The usual construction for a hydraulic actuator of the vane type makes use of a stator housing, a rotor journaled in the housing with an annular space between rotor and stator, and two pairs of vanes, one on the rotor and one on the stator, for dividing the annular space into two pairs of fluid-receiving chambers. A reversing hydraulic valve is associated with the rotary actuators so as to supply high pressure fluid to either pair of chambers, and to withdraw fluid from the second pair. It is generally the practice to balance the pressures in the system by disposing the vanes on the rotor diametrically opposite each other, and similarly disposing the vanes on the stator diametrically opposite each other. This is by far the preferred arrangement for the present invention, although it will be evident to those skilled in the art that the invention might also be employed with more than two vanes on both rotor and stator, but preferably symmetrically disposed to balance pressures. Of course, any increase in the number of vanes ordinarily reduces the angle of rotation through which the actuator may operate; thus, with only two vanes on each member, rotation in either direction of almost 180° is possible, whereas with four vanes on each member, for example, slightly less than 90° rotation would be the limit for operation in one direction. The extent to which the angle of rotation is reduced below the optimum is determined by the circumferential space required for the vanes.

A feature employed in the present invention to avoid unnecessary strains in the structural members is the employment of unrestrained vanes. An unrestrained vane is one which is associated with either rotor or stator, but is not an integral structural part thereof. A preferred form, used in the illustrative embodiment described below, is a vane in the form of a cylindrical steel roller which is received in a slot in the surface of its associated member. Such a vane serves only to transmit torque to the rotor. Rotational forces on the vane itself are unresisted, and the vane may rotate in its slot without establishing any stress between the vane and its associated member.

While the unrestrained vane has the great advantage of avoiding useless stress in the member which carries it, or in the vane itself, it has an objectionable friction characteristic not found in the integral vane, which characteristic becomes a very serious defect at high pressures. Thus, the ordinary cylindrical vane for the rotor, for example, is received in a semicircular channel in the rotor with sufficient looseness to permit the high pressure fluid to get under the vane and force it outwards toward the adjacent wall of the stator. The high pressure fluid encircles almost 270° of the vane and causes the development of a radial force proportional to the pressure times the radius times the length of the vane. The radial forces on the freely floating cylindrical vane are unbalanced. In heavier and cruder machines for automotive devices and the like, such unbalance may be tolerated because of the relatively low pressure of the fluid. However, high pressure rotary actuators with unrestrained vanes have been found impractical because of the unbalance above described, although, the cause of the operating difficulties of such high pressure devices was not heretofore understood.

It is the major object of the present invention to replace the simple cylindrical or semicircular vane slot by a slot of novel cross-section and novel associated seal means so that the high pressure fluid is applied to only about 180° of the cylindrical surface of the vane. By so doing, the design of the present invention balances out almost all radial forces, and high pressure operation can be achieved with an unrestrained vane type of rotary actuator without serious friction problems from unbalanced radial forces.

In the past, there have been attempts to remedy the problems of satisfactory sealing without restraint on the vane by using vanes of flexible plastic material. Unfortunately, such plastic materials are deformed to much by high pressures to be practical, except as small, closely confined, sealing members. It is an important object of the present invention to combine the structural advantages of rigid metal vanes with the sealing advantages of flexible materials. It is a necessary feature of the unrestrained vane type of construction that the tangential force which supplies the desired torque must be exerted on one edge of the vane slot (the low pressure or downstream edge). In the simple semicircular vane slot type of construction, the tangential working force is applied at the same line of contact as that at which sealing is accomplished. This is very undesirable at high pressures, since the same structural surface must have both high strength and good sealing qualities. It is an important object of the present invention to transfer the line of sealing from the low pressure or downstream edge of the vane slot to the bottom of the slot, or to a line very near a point diametrically opposite the contact between the vane and the opposite actuator member.

Another object of the invention is to provide a rotary actuator construction which is adaptable to standard machine practices, such as broaching, and which does not demand precision fitting between the vane and its associated slotting member in order to provide both satisfactory strength and sealing at high pressures.

The foregoing and other objects are accomplished by providing a longitudinal sealing member of relatively small diameter along the bottom of the vane slot. The vane slot is formed to closely receive the vane at the point at which tangential forces are exerted, but to provide free access of the hydraulic fluid to the undersurface of the vane. It will be seen from the following description, that radial force is not eliminated entirely. However, the radial force is reduced in proportion to the radius of the sealing member, which can be made very small as long as it is sufficiently strong to accomplish its sealing purpose.

The construction and principles of the invention may be understood from the following description of a specific embodiment taken in connection with the accompanying drawings, in which.

Figure 1:
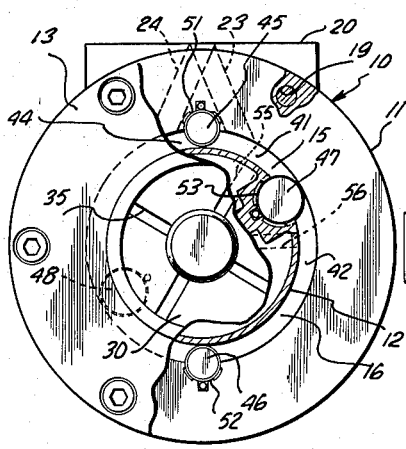
Figure 1 is a left end elevational view of a hydraulic rotary actuator with the end plate partially broken away to reveal two of the stator vanes and one of the rotor vanes.
Figure 2:
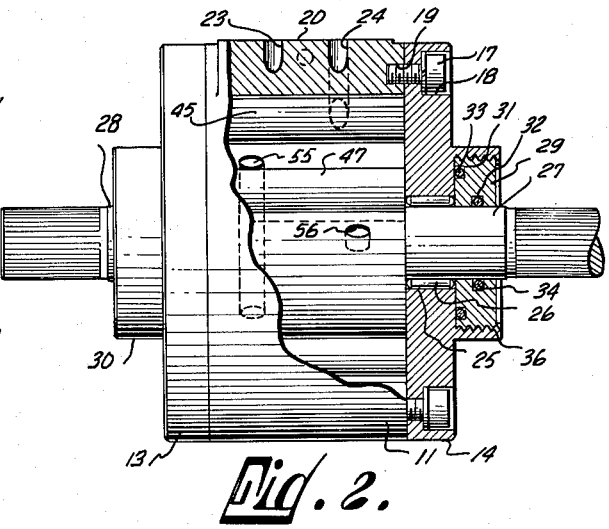
Figure 2 is a front elevational view partially broken away and sectioned to reveal the manner in which the rotor is journaled in the stator.

In Figure 1 a rotary actuator indicated generally by the numeral 10 is seen to be comprised principally of a hollow cylindrical stator housing 11 and a rotar 12, the latter being enclosed in the housing 11 by end plates 13 and 14 (also seen in Figure 2). Preferably, the rotor is cylindrical and substantially fills a cylindrical cavity 15 except for an annular space 16. The diameter of the rotor 12 should be more than half the diameter of the cavity 15.

The end plates 13 and 14 are fastened to the stator 11 by means of machine screws 17 received in holes 18 about the periphery of the end plate, and threaded into threaded bores 19 in the stator 11.

Figure 3:
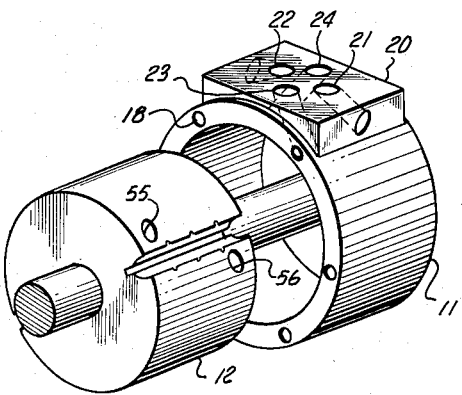
Figure 3 is an exploded view of the rotor and stator only, vanes, end plates, etc., being removed to show the rotor and stator only.

Preferably, the stator 11 is surmounted by a valve platform 20, for the mounting of a reversing control valve. As best seen in the perspective view of Figure 3, the valve platform 20 is drilled to provide the four hydraulic fluid passages, 21 for admitting high pressure fluid to the valve, 22 for withdrawing low pressure fluid from the valve, and 23 and 24 for dispatching either high or low pressure fluid, alternatively at choice, to one side or the other of the interior of the rotary actuator 10.

The end plates 13 and 14 fit closely against the ends of the rotor 12, and are centrally bored at 25 to accommodate the roller bearings 26 in which the shafts 27 and 28 of the rotor 12 are journaled. The outsides of the bearings 26 are closed by means of threaded seal caps 29 and 30, which contain sealing grooves 31 and 32 with sealing O-rings 33 and 34. The end caps 29 and 30 are shown as provided with splines 35 to facilitate threading into the end cap threads 36.

Figure 1 reveals that the interior annular space 15 is divided into four compartments 41, 42, 43 and 44, by two pairs of cylindrical vanes, two stator vanes 45 and 46 at the top and bottom of the stator 11 respectively, and two rotor vanes 47 and 48 (the latter being visible in dashed outline only) disposed at an angle of about 60° clockwise turn from the vertical.

The stator vanes 45 and 46 are received in vane slots 51 and 52 in the stator, and the rotor vanes 47 and 48 are received in vane slots 53 and 54 in the rotor; these slots and the associated sealing and load bearing means to be described hereinafter may be all of the same type, as will be described in connection with Figure 4 and Figure 6.

The chambers 41 and 43 constitute a pair which are in communication with each other through a small diameter bore 55 drilled through the rotor 12 from a point just above the vane 47 to a point just below the vane 48. Similarly, the chambers 42 and 44 are placed in communication by means of a bore hole 56 drilled through the rotor 12 from a point just below the rotor vane 47 to a point just above the rotor vane 48. Thus, when a reversing control valve (not shown) mounted on the valve pad 20 dispatches high pressure fluid through bore 23, both chambers 41 and 43 are filled with high pressure fluid; at the same time, fluid is withdrawn from both chambers 42 and 44 by way of stator bore 24, thus causing the rotor 12 to rotate in a clockwise direction as seen in Figure 1. Conversely, reversal of the valve on platform 20 exchanges the pressure values in the chambers 41 to 44 and produces counterclockwise rotation. Obviously, rotation is limited to an angle of somewhat less than 180°.

For purposes of description, only the rotor vane slot 53 and its coaction with rotor vane 47 will be described, since the other vanes and slots are constructed and operate in analogous manner.

In the cross sectional view of Figure 4, and the perspective view of Figure 5, it is seen that although the vane 47 is cylindrical in shape, the slot 53 is shaped in a profile which is not cylindrical, but is relieved on each side to provide a pair of chambers 61 and 62, which are referred to as pressure-balancing chambers for reasons which will become apparent hereinafter. Also, the bottom of the slot 53 is slotted with a longitudinal slot 63, which may be referred to as the seal slot because it accommodates a rod or tube seal member 64. While a diversity of shapes and materials might be employed by one skilled in the art for seal member 64, steel hypodermic needle tubing has been found very satisfactory. It is much preferred that the seal strip member be round, to permit rotation on the surface of the vane 47, should it rotate, but with a significantly increased stress, other shapes might be employed, if other considerations warranted it. In the bottom of slot 64, a long strip of spring steel 65, which is transversely corrugated throughout its length, provides a resilient and springy cushion which urges the seal member 64 into sealing contact with the surface of the vane 47. However, it will be understood that high pressure fluid is ordinarily present in the slot 63 and serves to urge the seal member 64 upwardly into sealing contact. Consequently, the presence of the spring member 65 provides a species of the invention which has special advantages if the pressure might fluctuate, but the spring 65 could be eliminated for the construction of simpler species of the invention, if pressure were found to be sufficient for supporting the seal member 64. In still another species of the invention, the seal member 64 might be constructed of Teflon tubing or rod, which would be deformed and cause to flow into the contour of the cross section of the slot 63, making sealing contact with the surface of the vane 47.

The vane slot 53 contacts the vane 47 along four longitudinal lines, or regions, by means of four shoulders, two load bearing shoulders 66 and 67, and two sealing shoulders 68 and 69. The load bearing shoulders 66 and 67 are appropriately so named, because one of them, the one on the downstream or low pressure side, experiences the thrust of the tangential load. Thus, in Figure 4, the arrow 70 would indicate the direction of tangential load causing rotation of the rotor 12 when high pressure was present in chambers 41 and 43. The seal shoulders 68 and 69, however, are named more for their location than for function, since they do not necessarily perform any sealing. It is true that sealing must be accomplished by seal member 64 partly against one wall of the slot 63, but this does not necessarily require the presence of a seal shoulder. The latter are provided for a species of the invention in which it is desired to closely confine the disposition of the vane.

Figure 4:
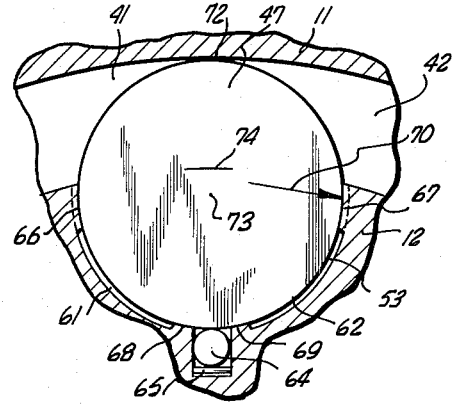
Figure 4 is an enlarged sectional view of rotor and stator in the vicinity of one of the rotor vanes, seen in end view, showing the vane slot and the associated sealing means in maximum detail.
Figure 5:
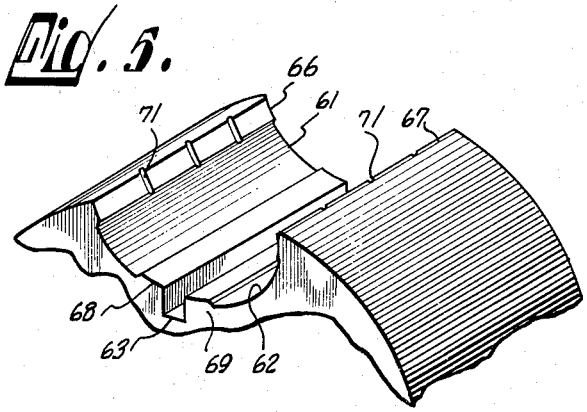
Figure 5 is an enlarged perspective view of a fragment of the rotor, showing the vane slot in detail.

While it is desired that the vane slot 53 receives the cylindrical vane 47 much more closely than would be necessary in the semicircular slot construction, contact being made along the shoulders 66 to 69, it is desired that the hydraulic fluid in the fluid-receiving chambers 41 to 44 have free access to the adjacent pressure-balancing chambers, such as chambers 61 and 62 shown in vane slot 53 in Figure 4. Thus, in the illustration of Figure 4, high pressure fluid from the fluid-receiving chamber 41 should have access to the pressure-balancing chamber 61 and low pressure fluid from the chamber 42 should have free access to the pressure-balancing chamber 62. In the species illustrated, the access is provided by a plurality of channels 71, which may be referred to as pressure transfer channels since their role is to transfer the adjacent fluid-receiving chamber pressure to the pressure-balancing chamber; there will be only microscopic amounts of actual flow of hydraulic fluid, since the pressure-balancing chambers 61 and 62, although essential, are not large.

The distribution of fluid to the pressure-balancing chambers 61 and 62, with sealing at the bottom of the vane slot 53 by sealing member 64, causes high pressure to be distributed over the upstream or high pressure side of the vane 47, over a surface area of about 180°. Consequently, the desired tangential working force 70 is exerted almost normal to the downstream bearing shoulder 67. If the slot 53 were semicircular, and slightly enlarged so as to employ the high pressure fluid as a sealing means, high pressure fluid would find its way to the chamber 62 also, and there would be developed a large radial force pressing the vane 47 upwardly against the cylindrical wall surface of the stator 11. At the point of contact 72, between vane 47 and stator 11, sealing would be good because of the pressure, but friction would also be very great. At high pressures, the pressure exerted at the point 72 would be far in excess of that required for satisfactory sealing at that point. In the present invention the pressure developed at the line 72 is determined by the size of the seal member 64, being proportional to its radius, and is not dictated by the radius of the vane 47. The seal member 64 may be as small as that permitted by the sealing pressure required at the line 72.

Fluid may leak from the high pressure-balancing chamber 61 past shoulder 68 into the seal slot 63. However, precautions to assure such leakage need not be taken as it will ordinarily be enough from imperfections in the surface of shoulder 68 to prevent any radial pressure from developing. Also, the radial force inward toward the rotor 12, which would be developed over the small area sealed off by seal shoulder 68, would not be so great as to be serious in most instances, because of the small area involved.

It will be understood that the pressure transfer channels 71 are merely provided to transfer the pressure of the working fluid to the pressure-balancing chambers 61 and 62, and are not critical as to shape, or even size. Thus, a rough surface finish on shoulders 66 and 67 might be sufficient to provide such pressure transfer channels. Porous chrome plating, for example, might provide numerous microscopic crevices through which sufficient pressure transfer would be achieved.

Another important feature of the invention in its preferred species is that the vane 47 may be received in the slot 53 to a depth slightly greater than its own radius. Indeed, it is a preferred form of the invention and a species of maximum strength and balance for the resultant tangential force 70 to pass between the center 73 of the vane 47, and the locus of the surface 74 of the rotor 12. Furthermore, it is a preferred species of the invention to so shape the load bearing shoulders 66 and 67 to direct the resultant force 70 with just enough radial component to balance out any unwanted radial component from the sealing member 64.

Figure 6:
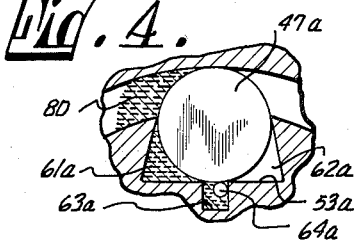
Figure 6 is a transverse sectional view of a part of a rotor slot, showing an alternative cross section for a vane slot.

Figure 6 serves both to illustrate another species of the invention, and to illustrate in greater detail the principle of the invention's sealing. The slot 53a is flat-sided with oblique walls to provide relatively larger pressure-balancing chambers 61a and 62a. The high pressure fluid is indicated by a crosshatching 80 and is seen to flow into the pressure-balancing chamber 61a and into the sealing slot 63a, lifting the seal member to the upper right hand corner of the slot 63a where it seals against the right wall of the slot 63a and the underside of the vane 47a. It will be seen that no spring is necessarily required, if the particular design being used is one in which pressure lifting of the seal member 64a can be relied upon without assistance under any of the operating conditions of the device.

It will be apparent to those skilled in the art that many departures may be made from the several species described or referred to in the preceding specification. The invention may be incorporated in systems which do not employ the novel vane and slot arrangement throughout the entire rotor and stator system, or in systems which are unbalanced or irregular as to other features. Various shapes and materials will readily suggest themselves to those skilled in the art who wish to adapt the invention to a particular application. However, it is my intention that all such adaptations which fall within the scope of the appendant claims be comprehended within the limits of the present invention, even if they exhibit considerable departure from the devices illustrated and described herein.

I claim:

1. A rotary hydraulic actuator which includes: a stator housing having a cavity; a rotor journaled in said housing and disposed in said cavity and having a space between a chamber wall of said rotor and a chamber wall of said stator interior to serve as a fluid-receiving chamber; walls defining a longitudinal vane slot in one of said chamber walls; a vane disposed in said vane slot and contacting the opposite chamber wall surface, a longitudinal member projecting from said opposite chamber wall surface and contacting the surface of said one chamber wall, said vane and longitudinal member cooperating to divide said fluid-receiving chamber into high and low pressure fluid-receiving chambers; walls defining fluid passages, each communicating with one of said high and low pressure fluid-receiving chambers; walls defining a longitudinally disposed seal slot at the bottom of said vane slot; a seal member disposed in said seal slot and adapted to provide sealing between said high and low pressure fluid-receiving chambers; a pair of load shoulders associated with said vane slot, one of said shoulders being disposed along each side of said vane slot and adapted to bear on substantially opposite sides of said vane; walls defining a pair of pressure-balancing chambers in the side walls of said vane slot, one of said chambers being disposed on each side of said vane slot between one of said load shoulders and said seal slot; and means providing fluid communication between each of said high and low pressure fluid-receiving chambers and the adjacent pressure-balancing chamber.

2. A rotary hydraulic actuator which includes: a stator housing having a cylindrical cavity, the cylindrical walls of said cavity having at least two longitudinal vane slots; a rotor journaled in said housing and disposed in said cavity with an annular space around said rotor, the wall of said rotor having at least two longitudinal vane slots; a vane disposed in each of said vane slots and contacting the opposite wall surface to divide said annular space into at least two pairs of fluid-receiving chambers; walls defining a pair of fluid passages, each communicating with one of said pairs of fluid-receiving chambers; walls defining a seal slot at the bottom of each of said vane slots; a seal member disposed in each of said seal slots and adapted to provide sealing between each of said pairs of fluid-receiving chambers; a pair of load shoulders associated with each vane slot, one of said shoulders being disposed along each side of said vane slot and adapted to bear on opposite sides of said vane; walls defining a pair of pressure-balancing chambers in the side walls of each of said vane slots, one of said chambers being disposed on each side of said slot between one of said load shoulders and said seal slot; and means providing fluid communication between each of said fluid-receiving chambers and the two pressure-balancing chambers adjacent to it.

3. A rotary hydraulic actuator which includes: a stator housing having a cylindrical cavity, the cylindrical walls of said cavity having a pair of longitudinal vane slots disposed diametrically opposite one another; a cylindrical rotor journaled in said housing and substantially filling said cavity except for an annular space around said rotor, the cylindrical wall of said rotor having a pair of longitudinal vane slots disposed diametrically opposite one another; a cylindrical vane disposed in each of said vane slots and contacting the opposite cylindrical wall surface to divide said annular space into two pairs of fluid-receiving chambers; walls defining a pair of fluid passages, each communicating with one of said pairs of fluid-receiving chambers; walls defining a longitudinally disposed seal slot at the bottom of each of said vane slots; a seal member disposed in each of said seal slots and adapted to provide sealing between each of said pairs of fluid-receiving chambers; a pair of load shoulders associated with each vane slot, one of said shoulders being disposed along each side of said vane slot and adapted to bear on substantially diametrically opposite regions of the surface of said vane; walls defining a pair of pressure-balancing chambers in the side walls of each of said vane slots, one of said chambers being disposed on each side of said slot between one of said load shoulders and said seal slot; and means providing fluid communication between each of said fluid-receiving chambers and the two pressure balancing chambers adjacent to it.

4. A rotary hydraulic actuator which includes: a stator housing having a cylindrical cavity, the cylindrical walls of said cavity having a pair of longitudinal vane slots disposed diametrically opposite one another; a cylindrical rotor journaled in said housing and substantially filling said cavity except for an annular space around said rotor, the cylindrical wall of said rotor having a pair of longitudinal vane slots disposed diametrically opposite one another; a cylindrical vane disposed in each of said vane slots and contacting the opposite cylindrical wall surface to divide said annular space into two pairs of fluid-receiving chambers; walls defining a pair of fluid passages, each communicating with one of said pairs of fluid-receiving chambers; a seal member at least partly recessed in the bottom of each of said vane slots and adapted to provide sealing between each of said pairs of fluid-receiving chambers; a pair of load shoulders associated with each vane slot, one of said shoulders being disposed along each side of said vane slot and adapted to bear on substantially diametrically opposite regions of the surface of said vane; walls defining a pair of pressure-balancing chambers in the side walls of each of said vane slots, one of said chambers being disposed on each side of said slot between one of said load shoulders and said seal member; and walls defining channels in said load shoulders to provide communication between one of said pressure-balancing chambers and one of said fluid-receiving chambers.

5. A rotary hydraulic actuator which includes: a stator housing having a cylindrical cavity, the cylindrical walls of said cavity having a pair of longitudinal vane slots disposed diametrically opposite one another; a cylindrical rotor journaled in said housing and substantially filling said cavity except for an annular space around said rotor, the cylindrical wall of said rotor having a pair of longitudinal vane slots disposed diametrically opposite one another; a cylindrical vane disposed in each of said vane slots and contacting the opposite cylindrical wall surface to divide said annular space into two pairs of fluid-receiving chambers; walls defining a pair of fluid passages, each communicating with one of said pairs of fluid-receiving chambers; walls defining a longitudinally disposed seal slot at the bottom of each of said vane slots; a cylindrical seal member disposed in each of said seal slots and adapted to provide sealing between each of said pairs of fluid-receiving chambers; a pair of load shoulders associated with each vane slot, one of said shoulders being disposed along each side of said vane slot and adapted to bear on substantially diametrically opposite regions of the surface of said vane; walls defining a pair of pressure-balancing chambers in the side walls of each of said vane slots, one of said chambers being disposed on each side of said slot between one of said load shoulders and said seal slot; walls defining channels in said load shoulders to provide communication between each of said fluid-receiving chambers and the two pressure-balancing chambers adjacent to it; and walls defining a pair of shoulders associated with each seal slot, one of said shoulders being disposed along each side of the opening of said seal slot.

6. A rotary hydraulic actuator which includes: a stator housing having a cylindrical cavity, the cylindrical walls of said cavity having a pair of longitudinal vane slots disposed diametrically opposite one another; a cylindrical rotor journaled in said housing and substantially filling said cavity except for an annular space around said rotor, the cylindrical wall of said rotor having a pair of longitudinal vane slots disposed diametrically opposite one another; a cylindrical vane disposed in each of said vane slots and contacting the opoiste cylindrical wall surface to divide said annular space into two pairs of fluid-receiving chambers; walls defining a pair of fluid passages, each communicating with one of said pairs of fluid-receiving chambers; walls defining a longitudinally disposed seal slot at the bottom of each of said vane slots; a resilient tubular seal member disposed in each of said seal slots and adapted to provide sealing between each of said pairs of fluid-receiving chambers; a spring means in the bottom of each of said seal slots, under said seal member to urge said seal member against the cylindrical surface of said cylindrical vane; a pair of load shoulders associated with each vane slot, one of said shoulders being disposed along each side of said vane slot and adapted to bear on substantially diametrically opposite regions of the surface of said vane; walls defining a pair of pressure-balancing chambers in the side walls of each of said vane slots, one of said chambers being disposed on each side of said slot between one of said load shoulders and said seal slot; walls defining channels in said load shoulders to provide communication between each of said fluid-receiving chambers and the two pressure-balancing chambers adjacent to it; and walls defining a pair of sealing shoulders associated with each seal slot, one of said shoulders along each side of the opening of said seal slot and adapted to provide sealing contact with said seal member.

7. A rotary hydraulic actuator which includes: a stator housing having a cylindrical cavity, the cylindrical walls of said cavity having a pair of longitudinal vane slots disposed diametrically opposite one another; a cylindrical rotor journaled in said housing and substantially filling said cavity except for an annular space around said rotor, the cylindrical wall of said rotor having a pair of longitudinal vane slots disposed diametrically opposite one another; a cylindrical vane disposed in each of said vane slots and contacting the opposite cylindrical wall surface to divide said annular space into two pairs of fluid-receiving chambers, each of said vanes being received in its vane slot to a depth below the cylindrical wall surface which is greater than the radius of said vane; walls defining a pair of fluid passages, each communicating with one of said pairs of fluid-receiving chambers; a seal member at least partly recessed in the bottom of each of said vane slots and adapted to provide sealing between each of said pairs of of fluid-receiving members; a pair of load shoulders associated with each vane slot, one of said shoulders being disposed along each side of said vane slot and adapted to bear on substantially diametrically opposite regions of the surface of said vane; walls defining a pair of pressure-balancing chambers in the side walls of each of said vane slots, one of said chambers being disposed on each side of said slot between one of said load shoulders and said seal member; and walls defining channels in said load shoulders to provide communication between one of said pressure-balancing chambers and one of said fluid-receiving chambers.

8. A rotary hydraulic actuator comprising a stator housing having an internal surface defining a cavity, a rotor supported in said cavity for rotation and having an external surface spaced from the internal surface of said housing to define a fluid receiving chamber, a longitudinal vane slot in one of said surfaces, a vane disposed in said vane slot and contacting the other of said surfaces, a longitudinal member projecting from said other surface and contacting said one surface, said vane and member cooperating to divide said chamber into fluid receiving sub-chambers, means providing fluid passages respectively communicating with said sub-chambers, and a seal of circular cross-section disposed for rotation at the bottom of said slot and engageable with said vane to seal said sub-chambers from each other.

9. A rotary hydraulic actuator comprising a stator housing having an internal surface defining a cavity, a rotor supported in said cavity for rotation and having an external surface spaced from the internal surface of said housing to define a fluid receiving chamber, a longitudinal vane slot in one of said surfaces, a vane disposed in said vane slot and contacting the other of said surfaces, a longitudinal member projecting from said other surface and contacting said one surface, said vane and member cooperating to divide said chamber into fluid receiving sub-chambers, means providing fluid passages respectively communicating with said sub-chambers, a longitudinal seal slot at the bottom of said vane slot, and a seal of circular cross-section disposed for rotation in said seal slot and engageable with said vane to seal said sub-chambers from each other.

10. A rotary hydraulic actuator comprising a stator housing having an internal surface defining a cylindrical cavity, a rotary supported in said cavity for rotation and having a cylindrical external surface of smaller diameter than said cavity and concentric therewith to provide an annular space between said cavity and rotor, said housing having in its internal surface a pair of longitudinal diametrically opposite vane slots opening into said annular space, said rotor having in its external surface a pair of longitudinal diametrically opposite vane slots opening into said annular space, a vane in each of said housing vane slots contacting the external surface of said rotor and a vane in each of said rotor vane slots contacting the internal surface of said housing to divide said annular space into two pairs of fluid receiving chambers, means providing fluid passages each communicating with one of said pairs of fluid receiving chambers, a longitudinal seal slot at the bottom of each of said vane slots, and seals of circular cross-section disposed for rotation in said vane slots and engageable with said vanes to seal said fluid receiving chambers from each other.

11. A rotary hydraulic actuator comprising a stator housing having an internal surface defining a cavity, a rotor supported in said cavity for rotation and having an external surface spaced from the internal surface of said housing to define a fluid receiving chamber, a longitudinal vane slot in one of said surfaces, a vane disposed in said vane slot and contacting the other of said surfaces, a longitudinal member projecting from said other surface and contacting said one surface, said vane and member cooperating to divide said chamber into fluid receiving sub-chambers, means providing fluid passages respectively communicating with said sub-chambers, a longitudinal seal slot at the bottom of said vane slot, a seal disposed in said seal slot and engageable with said vane to seal said sub-chambers from each other, a pair of load shoulders associated with said vane slot, one of said shoulders being disposed along each side of said vane slot and adapted to bear on substantially opposite sides of said vane, a pair of pressure balancing chambers in the side walls of said vane slot, one of said pressure balancing chambers being disposed on each side of said vane slot between said load shoulders and said seal slot, and means providing fluid communication between each sub-chamber and the adjacent pressure balancing chamber.

12. A rotary hydraulic actuator comprising a stator housing having an internal surface defining a cylindrical cavity, a rotor supported in said cavity for rotation and having a cylindrical external surface of smaller diameter than said cavity and concentric therewith to provide an annular space between said cavity and rotor, said housing having in its internal surface a pair of longitudinal diametrically opposite vane slots opening into said annular space, said rotor having in its external surface a pair of longitudinal diametrically opposite vane slots opening into said annular space, a vane in each of said housing vane slots contacting the external surface of said rotor and a vane in each of said rotor vane slots contacting the internal surface of said housing to divide said annular space into two pairs of fluid receiving chambers, means providing fluid passages each communicating with one of said pairs of fluid receiving chambers, a longitudinal seal slot at the bottom of each of said vane slots, seals disposed in said vane slots engageable with said vanes to seal said fluid receiving chambers from each other, a pair of load shoulders associated with each vane slot, one of said shoulders of each pair being disposed along each side of the associated vane slot and adapted to bear on substantially opposite sides of said vane, a pair of pressure balancing chambers in the side walls of each vane slot, one of the chambers of each pair being disposed on each side of said vane slot between the load shoulders and seal slot thereof, and means providing fluid communication between said fluid receiving chambers and the adjacent pressure balancing chambers.

References Cited in the file of this patent
UNITED STATES PATENTS

| | | |
|---|---|---|
| 2,778,340 | Greeley | Jan. 22, 1957 |
| 2,880,045 | Wankel | Mar. 31, 1959 |